US008611867B2

(12) United States Patent
Swanburg et al.

(10) Patent No.: US 8,611,867 B2
(45) Date of Patent: Dec. 17, 2013

(54) SYSTEMS AND METHODS FOR PROFILE-BASED MOBILE COMMERCE

(75) Inventors: Scott Allen Swanburg, Duluth, GA (US); James Patrick Ryan, Roswell, GA (US); Sashonda Warren, Duluth, GA (US); Shih-Ming Wang, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1766 days.

(21) Appl. No.: 11/727,493

(22) Filed: Mar. 27, 2007

(65) Prior Publication Data
US 2008/0242274 A1    Oct. 2, 2008

(51) Int. Cl.
*H04M 3/42*    (2006.01)
(52) U.S. Cl.
USPC ......... 455/414.1; 455/424; 455/405; 705/1.1; 705/35
(58) Field of Classification Search
USPC ............... 455/424, 414.1, 405; 705/1, 1.1, 35
See application file for complete search history.

(56) References Cited

U.S. PATENT DOCUMENTS

| | | | |
|---|---|---|---|
| 5,740,549 A | | 4/1998 | Reilly et al. |
| 2002/0107765 A1 * | | 8/2002 | Walker ............................. 705/35 |
| 2004/0073566 A1 * | | 4/2004 | Trivedi .......................... 707/102 |
| 2004/0267664 A1 | | 12/2004 | Name et al. |
| 2005/0097040 A1 * | | 5/2005 | Chen et al. ...................... 705/40 |
| 2006/0224502 A1 * | | 10/2006 | McGowan ...................... 705/38 |
| 2007/0156696 A1 * | | 7/2007 | Lim ................................. 707/9 |
| 2008/0154714 A1 * | | 6/2008 | Liu et al. ......................... 705/14 |

OTHER PUBLICATIONS

Stathis Panis et al. 'Service Scenarios and Business Models for Mobile Commerce' In: Proc. of IST Mobile & Wireless Telecommunications Summit, Jun. 16-19, 2002, Thessaloniki, Greece.
Kwei-Jay Lin et al. 'The Design of a Personal and Intelligent Pervasive-Commerce System Architecture' In: Proceedings of the 2005 Second IEEE International Workshop on Mobile Commerce and Services(WMCS '05), 19 Jul. 2005, pp. 163-173, ISBN 0-7695-2391-9.
The International Bureau of WIPO, International Preliminary Report on Patentability, Aug. 28, 2008, see all.

* cited by examiner

*Primary Examiner* — Justin Lee
(74) *Attorney, Agent, or Firm* — Hartman & Citrin LLC (57) ABSTRACT

The invention discloses systems and methods for integrating Mobile Commerce applications with dynamically generated user profiles. A profiling engine collects and stores information regarding a mobile subscriber's usage of Mobile Banking, Mobile Payment, and Mobile Brokerage, and stores the information in a profile. A Dynamic Event Server Subsystem comprising a Mobile Broker analyzes patterns in the subscriber's usage of these applications. The mobile broker can thus provide intelligent feedback regarding purchases and financial transactions back to the applications and to the subscriber. This feedback is provided in real time.

13 Claims, 5 Drawing Sheets

SYSTEMS AND METHODS FOR PROFILE-BASED MOBILE COMMERCE

BACKGROUND OF THE INVENTION

1. Field of the Invention

The present invention relates generally to mobile networks. Specifically, the present invention relates to providing intelligent feedback to mobile subscribers based on dynamically generated profiles.

2. Background of the Invention

As mobile networks become faster, and telephones become more capable, mobile subscribers have access to services that were in the not so recent past relegated to physical tasks, or over a computer with an internet connection. Packet-based systems such as the IP Multimedia System (IMS) using the Session Initiation Protocol (SIP) allow companies to offer to mobile subscribers information delivery and services in lightweight packages. Mobile commerce is one exemplary set of services that is increasing the speed and efficiency of conducting financial transactions. Mobile commerce includes mobile banking as well as mobile payment and mobile brokerage. However, existing systems do not fully exploit the existing IMS infrastructure, which has potential to increase the depth of services offered to a single subscriber as well as the ability to customize these services. What is needed is a system that offers seamless online transactions as well as providing transactional services that are customized to the subscriber's preferences and patterns while saving excessive costs of consumer research and data collection.

Mobile Commerce is the ability to conduct commercial transactions using a mobile device. Early services included sale of ring-tones/games, video and audio content, location-based services such as maps, and delivery of a variety of other information. Increasingly, however, banks and other financial institutions are exploring the use of mobile commerce to broaden and retain their business by having online banking available 24/7 and from any location.

Mobile Banking is a service wherein subscribers not only have access to account information, such as bank balances, stock quotes, and financial advice, but can also initiate and perform transactions such as transferring funds, purchasing stock, and other related tasks using their mobile device. This trend is hardly surprising, considering that over 40% of U.S. households are comfortable with banking over the internet. Security concerns are mostly taken care of, and virtual tellers can do essentially everything that can be done by physically going to the bank. Today, many users can bank online via a mobile device if the bank offers a WAP-enabled bank site. A WAP based service requires hosting a WAP gateway. Mobile subscribers access the bank's site through the WAP gateway to carry out transactions, much like internet users access a web portal for accessing the banks services.

Similarly, Mobile Payment is paying for goods or services with a mobile device. This can be used in a variety of payment scenarios. Typical usage entails the user electing to make a mobile payment, being connected to a server via the mobile device to perform authentication and authorization, and subsequently being presented with confirmation of the completed transaction. Examples include Mobile Suica in Japan, which uses a prepaid RFID chip embedded in the mobile device. This allows a user to use their mobile phone at the point of sale to make a purchase.

However, besides the obvious problems of hardware compatibility for existing methods of Mobile Payment, and painstaking web-based navigation of online banking and filling out forms via a mobile device, there exists a deeper problem. Current Mobile Commerce applications lack a higher degree of automation and adaptation to context-based parameters such as user preferences. Additionally, there is lack of integration between multiple sources of electronic payment. The consumer may have multiple bank and/or credit and debit cards. At the point of sale, customer may not be aware of the credit balance on one of the accounts, or whether or not purchase of a certain item from a certain credit card qualifies for double rewards. Many deals and opportunities are missed out on.

It is well known that companies operating on the Internet or other networks have access to a vast amount of information about their customers and web site visitors, by recording transactions and planting cookies. This gives the company insight into the user's interests, information which can be used to offer customized products and services to the user or to target advertising at the user. The company sells its products more effectively, and the advertisers receive more sales per advertising dollar. Mobile providers also collect information about users of the network. Every time a client uses an application or service, such as text-messaging, a billable event is generated and recorded. Mobile operators can use the information generated to offer tailored products and services to users.

However, current Mobile Commerce services suffer from the same problem that other service/retail industries suffer, namely they cannot respond to users' actions in real time. Mobile operators generally only make recommendations based on a history of billing cycles, which delays their ability to target subscribers instantaneously. In the case of mobile commerce, the infrastructure to make real-time recommendations exists, but services are still limited to merely accessing information and making transactions. Even when a mobile device is used at a point of sale to make a purchase, there is no correlation between the subscriber's budget and account transactions, nor is there any correlation between multiple instruments of payment and real-time assessment for which type of payment is the most economical. For instance, a mobile subscriber may wish to purchase a specific item from a retail outlet. The subscriber would execute the payment application on his mobile device at the cash register, at which point his preset account would be debited with the cost of the item. If the subscriber also had a credit card account at the time that offered a rebate to customers purchasing said item at said retail outlet, he would not have known. Although the infrastructure exists to compile this useful information, current mobile commerce applications do not exploit this potential.

The point of purchase is a crucial time for offering advice to a subscriber because the ability to collect information can exist. What is lacking now is a system that uses existing records of past purchases, budgetary data, and user information to tailor feedback to the user about the next purchase. There is a lag between purchasing and intelligence regarding purchasing habits. What is needed is a system that collects information about subscribers in real time and processes this information instantly for the benefit of the subscriber.

SUMMARY OF THE INVENTION

The present invention offers systems and methods to automate financial transactions and to deliver relevant choices and recommendations to mobile subscribers based on dynamically generated user profiles. Information from user profiles is integrated with product and pricing details from retailers, lenders, and other sources to generate recommendations and provide the subscriber with options in real-time, which is crucial at the point of sale of an item. When a subscriber spots a specific item that he may wish to purchase, he signals this interest to a Mobile Broker, either by inputting product details into the mobile device or by browsing a catalog available on the device. The Mobile Broker is an element of a Dynamic Event Server Subsystem (DESS), which includes an Intelligent Information Control Repository (IICR). Using the subscriber's personal and financial information, as well as product, manufacturer, and retailer information from other databases, the Mobile Broker offers the subscriber options on best deals, similar products, and economical payment options. Additionally, the Mobile Broker informs lenders and retailers about the imminent purchase, and receives from them special offers, rebates, and other information related to the sale of that product. The present invention thus minimizes the lag between a subscriber's initial desire to purchase an item and the retailer and vendor's chance to provide the subscriber with the best deal possible.

The present invention also uses the information from the IICR to detect patterns in the mobile subscriber's Mobile Banking activity. The Mobile Banking application is tailored to offer all the features and services commonly available on an internet banking website, or via a physical teller. The Mobile Broker can be programmed to recognize repeating transactions, for instance, a subscriber transferring funds between two accounts every two weeks. This condition triggers a response from the Mobile Broker, wherein the Mobile Broker offers to the subscriber an option to automate the task in the future. Thus, the present invention makes life easier for the subscriber by automating routine financial transactions.

IP Multimedia Subsystems (IMS) combined with Session Initiation Protocol (SIP) provide the interoperability and standardization. Scenario Based Services (SBS) dynamically link applications and the data associated with these applications to provide a seamless and integrated user experience.

In one exemplary embodiment, the invention is a system involving a plurality of Dynamic Event Servers and Intelligent Information Collection Repository databases, where a subscriber's purchase history and preferences are aggregated and stored in a user profile so that feedback can be provided in real-time to the subscriber on demand.

In another exemplary embodiment, the invention is a real time intelligent broker that presents a subscriber with a compilation of multiple instruments of payment available to make an imminent purchase. The broker is a server within a plurality of servers, and the recommendations are tailored to a user profile that is stored in an Intelligent Information Collection Repository.

In another exemplary embodiment, the invention is a method for allowing lenders and retailers to compete for the subscriber's business in real time, based on information stored in databases within the Dynamic Event Server Subsystem, while the possibility of a purchase is imminent.

In yet another exemplary embodiment, the invention is a method for automating commonly performed financial transactions for a mobile subscriber.

DETAILED DESCRIPTION OF THE INVENTION

The present invention makes use of a combination of standards such as Internet Protocol (IP), IP Multimedia Subsystems (IMS), Java client architecture, and a newly defined User Interface that is termed herein and throughout this disclosure as Scenario Based Services (SBS). For a more detailed description of SBS and its components, reference is made to U.S. patent application Ser. No. 11/545,600, filed Oct. 11, 2006, entitled "Devices, Systems and Methods for Scenario Based Services and Intelligent User Feedback," now issued as U.S. Pat. No. 8,155,696, which is incorporated by reference herein in its entirety.

IP Multimedia Subsystems (IMS) combined with Session Initiation Protocol (SIP) provide the interoperability and standardization. IMS basically describes a system by which mobile operators can offer and charge for discrete services that are usually available on the internet, alongside current services being offered. These services include Mobile Banking, Mobile Payment, and Mobile Brokerage. This architecture works with any packet-switching network, is IP-based, and therefore has tremendous potential for services like VoIP, push-to-talk, videoconferencing, IM, presence information, etc. An example of a standardized signaling protocol is the Session Initiation Protocol (SIP). SIP allows two elements in a network to find each other and open lines of communication easily, and is a significant part of IMS. Ideally every mobile device and network element has a unique SIP address for the purposes of this disclosure. Interactive applications communicate with the user and among themselves using SIP signaling over an IP network, compile data, and submit patterns to the IICR. Compilation can take place either on the handset or at the server end. In addition, a mobile device for the purposes of this disclosure includes any communications device with the ability to send and receive data across IP or any related packet-based networks, as well as devices capable of communicating over PSTN or other legacy networks.

For the purposes of this invention, the term Scenario Based Services (SBS) is used herein to describe a setup in which a suite of applications is made available for use during differing scenarios and contexts. The present invention concentrates on applications involving Mobile Commerce, such as Mobile Banking, Mobile Payments, and Mobile Brokerage. The intelligent push and pull of applications foster communications across specific communities of interest. The user interface allows for a user defined customizable "desktop" accessing ability for using multiple applications simultaneously. The presentation of such universal information may be based on community or individual preferences. There are many operator advantages for using SBS over conventional systems. The present system can provide a menu of applications for communities of interest, lower cost of implementation through 3rd party software developers, provide higher subscriber retention through a differentiated service, add value through better response to customer needs, and improve granularity for service definitions through customer interaction, among others. Intelligence provided by SIP signaling may be used for interaction between applications at the Application Services layer.

Dynamic Event Server Subsystem (DESS) as used herein is a network system that contains network enabled applications to be offered up dynamically to mobile terminals with dependency on contextual usage. This system creates an efficient way in which to launch these applications, authenticate their use, store data associated with the usage of individual applications and the interaction between associated applications at the macro network level. New "state" information collected at the DESS may be transmitted to the terminal (or micro) level of the network. The state as well as usage information is eventually stored in a User Profile created in the Intelligent Information Collection Repository (IICR). Multiple levels of communication include interaction between the mobile device/client and the applications server (AS), between multiple application servers, and between multiple servers at which time the subscriber state change is collected and an aggregation server described in this disclosure as the Proxy Registration Authentication Collection (PRAC) server. PRAC Server is the interface to the IMS core, and controls subscriber access to the server hosting a particular application. Network authentication and security functions may be performed prior to engaging the PRAC server. Subscribers may be authenticated based on their current status of active registration for applications on the DESS.

The terms Mobile User, Mobile Subscriber, Consumer, and Customer all mean the same and may be used interchangeably throughout this application. The terms User Profile, Profile, Subscriber Profile, all refer to the profile of the mobile subscriber that is stored in the IICR.

Commercial transactions include financial transactions such as balance inquiries, deposits and withdrawals from accounts, transferring funds between accounts, and brokerage, as well as other transactions such as paying bills and making purchases at a point-of-sale. Accounts include, but are not limited to, checking, savings, credit cards, and rewards/air miles accounts. This includes any type of pre-paid account.

Mobile Commerce is the ability to conduct commercial transactions using a mobile device. It includes Mobile Banking, Mobile Payment, and Mobile Brokerage. Mobile Banking is a service wherein subscribers can perform typical bank teller/ATM transactions via a JAVA/J2ME or WAP application. Mobile Payment is paying for goods or services with a mobile device at the point of sale, and includes but is not limited to using a Mobile Device to deduct the cost of an item from a plurality of accounts.

The present invention delivers a variety of Mobile Commerce services to mobile subscribers based on dynamically generated user profiles over an IP Multimedia System (IMS). Scenario Based Services (SBS) and profiling engines are used to generate profiles of mobile subscribers based events that include but are not limited to purchase history, transactional history, location, and Mobile Banking activity. The subscriber himself may also opt to update his profile with bank, credit card, and other financial details, along with purchase preferences, budgets, and other information including but not limited to his address, location, and preferred retailers. This profile can be updated via the mobile device, or via any internet-enabled device. Alternatively, the profile can be updated by contacting the mobile operator and choosing from a variety of options.

Then, at any time, the subscriber may enter details about a certain product he wishes to purchase into the mobile device. Using a combination of the data stored on the mobile device, the subscriber profile stored in the IICR, and other databases, a server within the DESS acting as a Mobile Broker will present the subscriber with several purchase options including but not limited to similar deals from other vendors, similar products from other manufacturers, which bank/credit account to make the purchase with, how the purchase will impact the subscriber's budget, etc. The subscriber is provided with options to view all or part of these recommendations, and then has the ability to conduct transactions online as well as purchase the item using his mobile device if necessary.

In addition, the present invention records a customer's purchase history, preferred retailers, location information, as well as mobile banking transactions in the IICR, and offers to automate certain tasks when a pattern is detected and a response is triggered. For instance, a financial transaction such as paying a bill may be performed by the subscriber within a given date range biweekly, using the Mobile Banking application This would trigger an offer to the subscriber to automate that task. Alternatively, the subscriber may purchase ink cartridges every month for his small business. The Mobile Broker recognizes this pattern from the IICR, and offers the subscriber an option to automate this monthly purchase, or check available stock with the retailer. In this way, the invention combines transactional history, personal information, and real-time events to provide services and recommendations that are tailored to the subscriber's interests.

Figure 1:
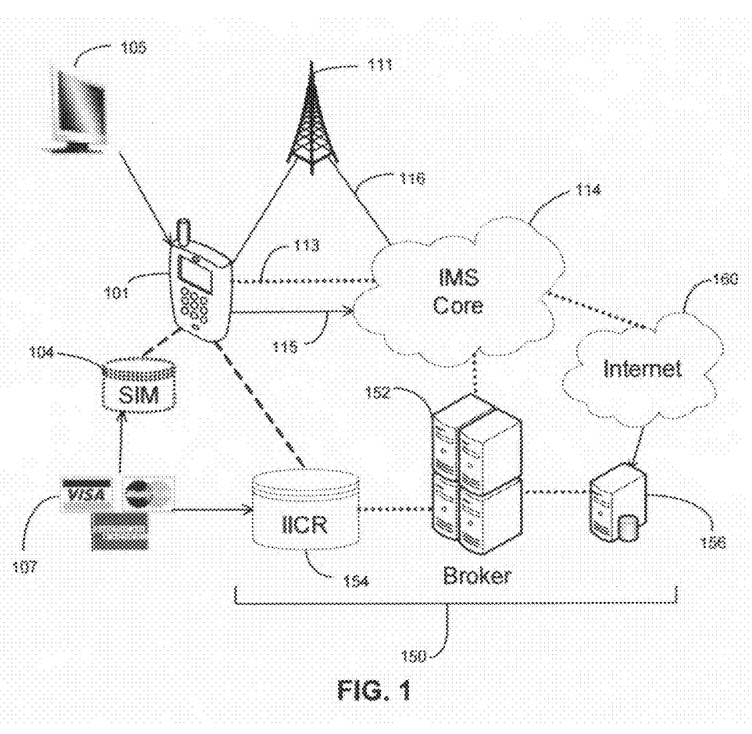
FIG. 1 shows an exemplary high-level setup of a Mobile Broker, according to an exemplary embodiment of the present invention.

FIG. 1 shows an exemplary high-level setup of the system. Dotted lines represent SIP communication. Mobile device 101 is in radio communication with radio tower 111, and is able to maintain SIP communication 113 with the IMS core 114. DESS 150 is a typical Dynamic Event Server Subsystem (DESS), generally comprised of a proxy server (not shown), a plurality of Dynamic Event Servers or Applications Servers 152, and an Intelligent Information Collection Repository (IICR) 154. For the purpose of this embodiment, the plurality of servers 152 represents a Mobile Broker. Optionally, there is a storage unit on the mobile device 101 such as a hard drive or a Subscriber Identity Module (SIM) card 104, or any equivalent storage device on the mobile network that can store the subscriber's data. Ideally, database 154 is an IICR, or alternatively, a combination of an IICR 154 and a database 104 that is within mobile device 101. DESS 150 also includes a database server 156, and a connection to the internet 160.

Ideally, the subscriber has provisioned his bank/credit card account information 107 either within SIM 104 or within his personal profile stored on IICR 154. The personal profile may also include subscriber's location information, preferred retail outlets, monthly/annual budget, along with a multitude of other information as well as programmed rules for feedback that are either set up by subscriber or automatically created. When subscriber is interested in purchasing a product, for instance HDTV 105, he inputs the product information into mobile device 101. The subscriber may be browsing the web, for instance on eBay, or he may be physically at a retail location. When physical proximity to the product is available, mobile device 101 may be equipped with a barcode scanner, or an RFID scanner. Alternatively, subscriber can merely punch in the make and model of HDTV 105. At this point, mobile device 101 is made aware that a purchase is imminent, and forwards a packet of information 115 to the Mobile Broker 152. This packet of information contains details for product 105, as well as the physical location of device 101, which retail/online store the product is kept in, and if necessary, financial information for the mobile subscriber that may be stored in SIM 104. Physical location may be determined by GPS, radiolocation/triangulation based on information sent 116 by radio tower 111, or any other equivalent mechanism known to one skilled in the art. The retail store information may be included within the bar code of product 105, or may be punched in by the subscriber. Alternatively, retail store information can be automatically derived by determining the location of device 101, and using information stored in either databases 152 and 156, or pulled from the internet 160.

Figure 2:
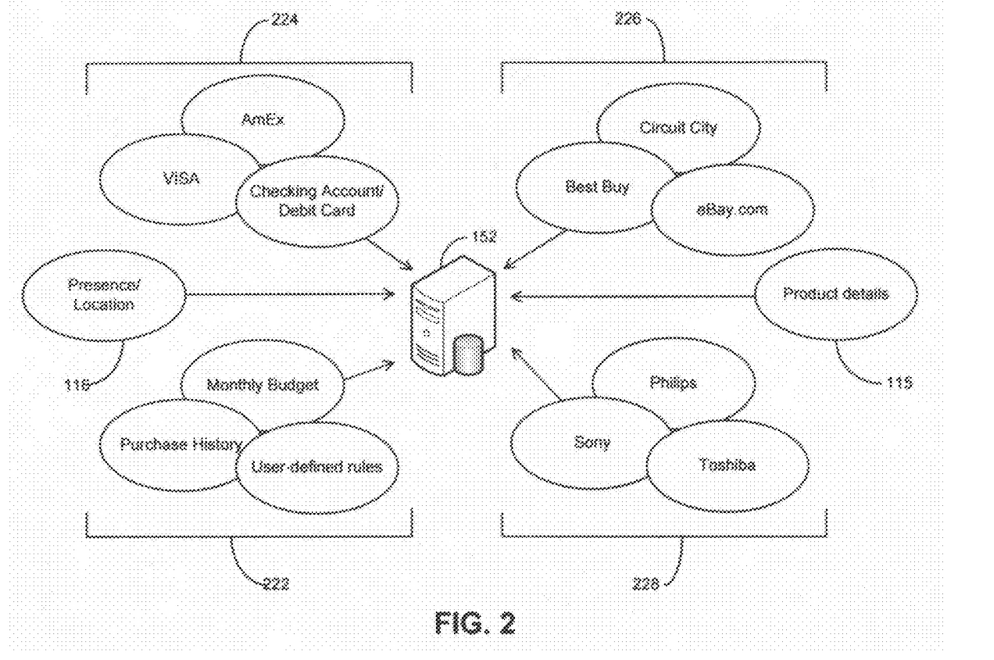
FIG. 2 shows a variety of information available to the broker, according to an exemplary embodiment of the present invention.

By this point, Mobile Broker 152 should have access to enough information to start offering choices to the subscriber. FIG. 2 indicates the types of information that Mobile Broker 152 should have access to. The information available to Mobile Broker 152 includes but is not limited to four main categories, plus information related to the instant sale. Besides product details 115 and location 116, Mobile Broker 152 can refer to the subscriber's personal information and purchase preferences/habits 222, financial information 224, as well as pricing and location information from retailers 226, and pricing/product information from manufacturers 228. At first, the user-defined rules may be applied. Subscriber may limit Mobile Broker 152 to offering only certain choices, such as avoiding retailers that are greater than ten miles away from the location of the device, or disallowing choices based on alternative manufacturers offering similar products. Alternatively, Mobile Broker 152 can offer a series of automated choices, such as the most economical credit card, or a rebate offered by another store, and subscriber can filter the search results according to his own preferences. Basically, the availability of information dictates the complexity of choices that Mobile Broker 152 can offer to the subscriber, and an IMS framework with seamless connectivity between network elements offers a wide array of information resources, therefore a wide array of services for the subscriber.

Additionally, since the mobile operator acts as the service broker, a new dimension of competition is created for credit card companies and financial institutions as well as for retailers and manufacturers. Assume that every subscriber on the network updates their personal profile with a list of credit card companies that the subscriber may consider signing up for. The real-time Mobile Broker provides to credit companies a "window" view of subscribers on the mobile network. When a purchase is imminent, the Mobile Broker allows all preferred credit card companies to view the purchase being made. This fosters competition between credit card companies. The subscriber's identity is arbitraged until the actual purchase is made. A separate credit score is held for the account so that the credit company knows the risk of the applicant in real time, as well as the associated purchase. When the customer scans or selects an item by punching it into his device, the Mobile Broker sends credit and purchase information to the credit company who will send a response. The Mobile Broker can then list the responses back to the subscriber, or alternatively, list offers that the subscriber has programmed into his preferences. Eventually, a list similar to the one in the previous example is provided, containing best offers from various credit companies. Thus, instead of relying on purchase (and payment) history, the credit company has an opportunity to "compete" for the business of the customer based on the actual event.

According to one embodiment of the present invention, the Mobile Broker provides real-time competing methods of payment for a single purchase at the point of sale. For instance, at a local electronics store, the subscriber spots the HDTV set priced at $4,300. In his physical wallet, the subscriber has $300 cash, a debit card with $600 in his checking account, a MasterCard, two VISA cards, one American Express card, and one Discover card, in addition to $5,000 in his savings account.

To find the cheapest purchase option, the subscriber can input the details of this HDTV into his mobile device. The subscriber may have exercised his choice at this point to create a monthly or annual budget, or a combination of budgets for different categories of items. The subscriber may have a budget for electronics, which is shown in Table 1.

TABLE 1

| Budget | Item - Electronics | Paid Amount |
| --- | --- | --- |
| $5,000 | HD TV | |
| $1,200 | Surround Sound | |
| $ 250 | Cell Phone | |
| $ 450 | Digital Camera | |
| $6,900 | TOTAL | |

This budget is also stored on the IICR. The Mobile Broker pulls the subscriber's account and budget information from the user profile stored in the IICR. Since the price of the HDTV does not exceed $5,000, the broker will not send a warning to the subscriber that he is about to exceed his budget. However, the broker does indicate that the subscriber does not have enough money in his checking account to purchase the HDTV. Using a banking application on his mobile device, the subscriber may transfer funds from his savings account to his checking account, and pay using his debit card. The procedure for setting up and using the baking application, also known as Mobile Banking, is described below and in FIGS. 3-5.

Additionally, the broker pulls up account details for each credit card, including APR, special offers such as rebates and bonuses, awards, as well as credit balance. Based on simple default rules such as avoiding overspending, and finding the lowest interest rate, as well as more customized user-defined rules, the broker sends a message to the screen of the mobile device letting the subscriber know that there exist more economical purchase options. For instance, the broker may have pulled information from the credit card database that American Express has set a policy for subscribers with a certain credit score and purchase of above $3,500 for a limited time. Any subscriber on the current subscriber's wireless network that matches a credit score of 720 and is interested in making a purchase for a certain period of time is given this "mobile" offer.

The subscriber chooses to view these options, that are listed in Table 2:

TABLE 2

| Source | Rate | Total |
| --- | --- | --- |
| MasterCard | 19% | $5,109 |
| Visa 1 | 17.5% | $5,034 |
| Visa 2 | 16% | $4,962 |
| *Amex | (2% bonus) | $4,150 |
| Discover | (1% bonus) | $4,425 |

The subscriber is now aware that using the American Exchange card offers the best deal in this exemplary scenario. The mobile broker has successfully made a real-time recommendation based on the current financial instruments available to the subscriber.

In another embodiment, the Mobile Broker provides real-time competing by manufacturers and outlets at the point of sale. Apart from advising the subscriber as to the best method of payment, the Mobile Broker will also advise the subscriber as to the best purchase price based on retail outlets in the immediate area. The database server in FIG. 1 collects information from manufacturers, including rebates and upgrades. This information is readily available to the broker, and may either be submitted by the manufacturers and retailers themselves, or made available as a download from the internet. When the subscriber inputs the HDTV details into his mobile device, the Mobile Broker presents him with an option to view a list of competing retailers that sell the same or similar products. This could work in many ways. For instance, the IICR may indicate that this particular HDTV manufacturer may have given a special rebate to a specified class of consumers at a particular outlet, and that this rebate is triggered when the presence of an imminent purchase is detected. Additionally, it happens to be the last day of the month and the outlet aims to reach their sales quota. This information is picked up by the Mobile Broker, and presented to the subscriber as a list of options in Table 3, similar to the above scenario:

TABLE 3

| Source | Price | Rebate | Total | Distance |
|---|---|---|---|---|
| Brandsmart | $4,300 | N/A | $4,300 | 2 |
| Best Buy | $4,620 | $100 | $4,520 | 14 |
| Circ City | $4,510 | N/A | $4,510 | 6 |
| *Costco | $4,150 | $100 | $4,050 | 10 |
| Sams Club | $4,300 | $100 | $4,200 | 0 |

Thus, the Mobile Broker displays all manufacturer rebates which have been triggered by the purchase, as well as the retail outlets which compete for the purchase and locations where the rebate is available. All the subscriber would have to do is push a button to map his preferred outlet from his current location, and pick up the product. The retailer may also provide information regarding stock supply, as well as availability of returned or open-box items. Additionally, the retailer may be an online retailer such as buy.com or eBay.com, in which case the subscriber is presented with a direct link to the website from which the item can be purchased. Combined with the previously described purchase option of using the American Express card, the Mobile Broker may even offer to automate the task of purchasing the HDTV, provided that the HDTV is in stock and that the price is in effect. All the subscriber would have to do is confirm the purchase. This allows the mobile device to be used as a mobile wallet, thus making the shopping around process easier for the subscriber.

In addition to value of options to the customer, this competition between lenders and retailers holds immense value to the lenders and retailers themselves. Credit companies are made aware of imminent purchases, and can compete in real-time based on the fact that a major purchase is about to take place. Additionally, the recording of such transactions and the history of purchase metrics based on the increased speed of these transactions is available for future offers to the same subscriber. Manufacturers and retailers also benefit from knowing that a customer in the immediate area is about to make a purchase. Even more powerful is their ability to redirect customers away from competing stores by offering instant rebates based on customer profiles and location. Thus, the present invention boosts the availability of information from higher-performance lenders and retailers, benefiting everyone including the consumer.

Mobile Broker 152 may also maintain and generate usage patterns for a subscriber's purchases, which are stored in the IICR. Thus, the broker can offer a plethora of services such as recommendations, product guides, alternative vendors, similar models, etc. This exploits the presence and connectivity of Location Based Services (LBS), and a plurality of databases of existing pricing models for similar products. For instance, a subscriber may be shopping after a holiday sales event, and has created a shopping list containing several items that are included in his budget. Whether the subscriber created the budget on his home or office computer, or via his mobile device, the budget is available via his mobile device. The Mobile Broker service in this case allows the subscriber to access his budget while he is shopping. As described in the previous example, the broker lists the best purchase options available to the subscriber like the lowest-interest credit card.

Aside from making recommendations, the subscriber can also have the choice to view all options, sort and search by various criteria, and program his own alerts. For instance, in the above example, one variable can be assigned to the amount of money saved by purchasing an item from an alternate retailer. The subscriber could set that value to a fixed number such as $200, or to any number that is greater than 10% of the price of the item. This allows the subscriber to filter out vendors and/or similar products that price their TV sets at less than 10% of the price of the current store. Alternatively, the subscriber may have restricted the list of available options to a traveling distance of less than ten miles from his current location. In that case, the Costco and Best Buy options would not have been listed. Since the connectivity between databases and application servers in an IMS system provides for a wide variety of options and recommendations, the subscriber has flexibility in programming/customizing alerts, as well as restricting his search terms.

To fully exploit the functionality of the Mobile Broker, the subscriber has to first make sure that his mobile device is able to access his bank accounts. The next few paragraphs and FIGS. 3-5 outline the process for provisioning account information and Mobile Banking generally.

Figure 3A:
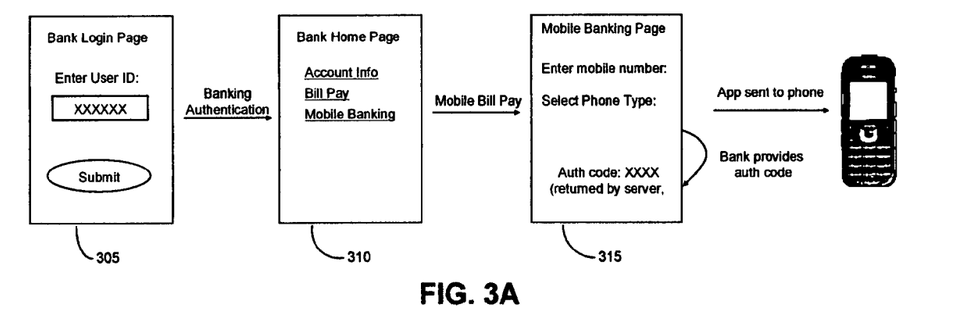
FIGS. 3A-C show the steps needed to set up Mobile Banking, according to an exemplary embodiment of the present invention.
Figure 3B:
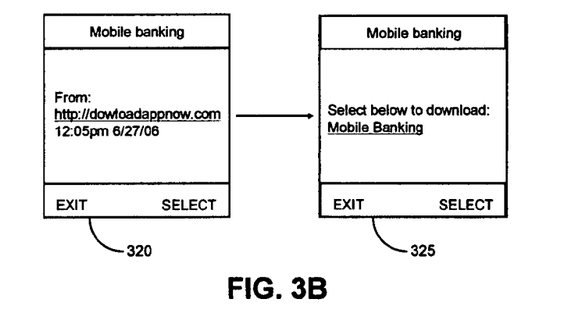
Figure 3C:
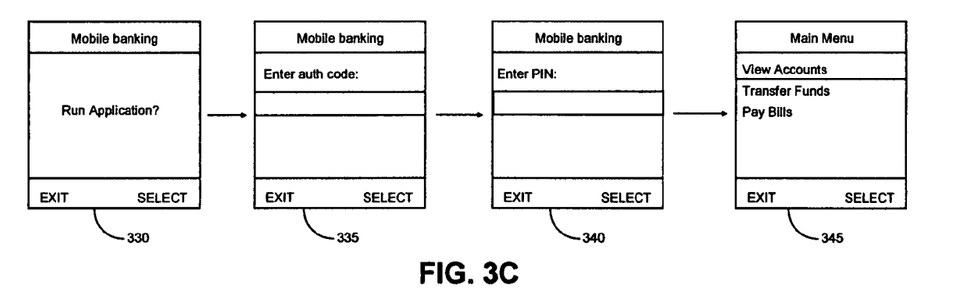

Since WAP sites raise security and footprint concerns, it makes sense to download an application that is tailored for a specific phone/operating system (O/S) such as Windows Mobile or Symbian. Alternatively, JAVA/J2ME applications can be used. The application may be bank-specific, in which case the subscriber can log in to the bank's online banking website and download and set up the mobile banking application. FIGS. 3A-C show exemplary steps needed to accomplish this. In FIG. 3A, the subscriber logs into his online banking website 305 via any device with an internet connection, including personal computers and mobile devices. Subscriber may bank online via the WAP site 310, or may select the mobile banking option which downloads the application to the mobile device (or computer, from which it can then be transferred to the mobile device). Before downloading, the subscriber may enter mobile information for download 315 such as his phone number and details on the device and O/S. Alternatively, the WAP site auto detects the device and O/S and initiates the download 320, thereby skipping the previous step and awaiting subscriber confirmation to download 325, as shown in FIG. 3B. The bank then returns an authentication code to the subscriber that is used to provision subscriber's account information in the next step in FIG. 3C. This authentication code may be emailed or sent as a text message to the subscriber's device. Alternatively, the code may be sent via conventional post office mail to the subscriber, or delivered in any form that maintains the security of the code and isolates it from the method used to access the WAP site. The application itself may be hosted by mobile content delivery providers such as Motricity, on application servers hosted by the mobile operator, by the subscriber's bank, or may even be preloaded on the subscriber's phone, in which case all the subscriber needs to do is provision his account information once, after which the application is ready for use.

The application may also be generic, allowing for single-person access to multiple bank accounts. In that case, the application will probably be hosted on external servers, and is configurable to set up multiple accounts. In either case, before first-time use, the application will have to be provisioned for the bank account. This means that the user's authentication code (provided by the bank) has to be entered and a PIN needs to be set to allow future access to the account.

An example of an automated provisioning method is shown in FIG. 3C. The first time the application is run 330, the subscriber is asked to enter the authentication code 335 sent by the bank. The subscriber then creates a PIN number 340 for accessing online banking. Then the account details 345 are available to the subscriber. This PIN code may be universal, e.g., for all of the subscriber's accounts, or it may be bank specific. In either case, the PIN is then stored in either the subscriber's SIM card, or within the DESS itself. Alternatively, the subscriber may be given the option to have to type in the PIN every time access is required, for security reasons. In this situation, before a purchase is made at point of sale, the subscriber would have to enter the PIN to use his bank accounts.

Figure 4A:
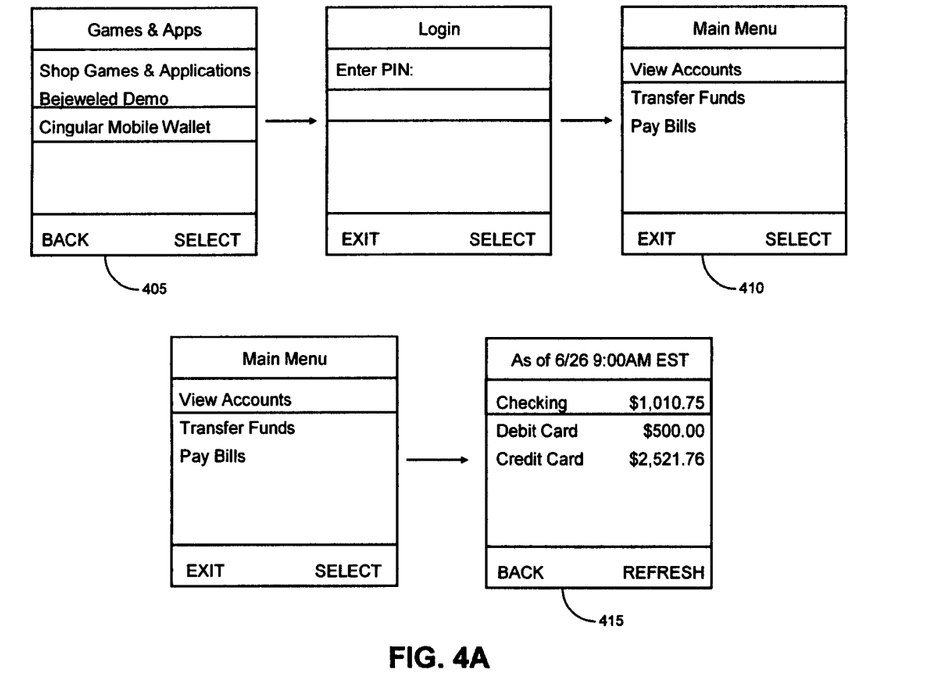
FIGS. 4A and B show uses of Mobile Banking, according to an exemplary embodiment of the present invention.
Figure 4B:
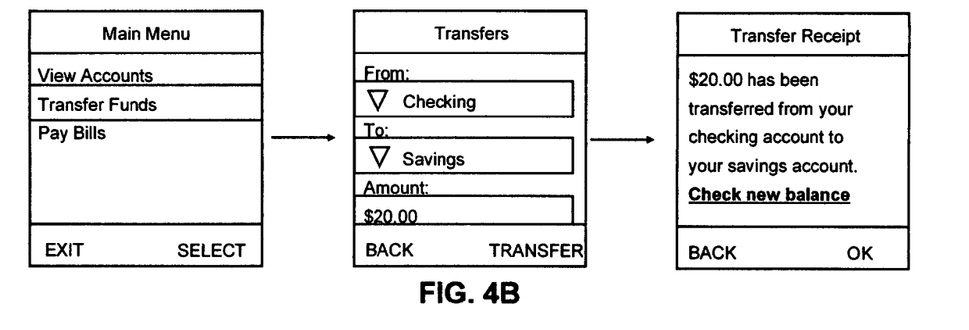

Once provisioning is complete, online banking is available at any time to the subscriber. FIG. 4A shows the basic steps to open the application 405, enter the PIN code to view the main banking menu 410, and viewing an account summary 415. Similarly, FIG. 4B shows intra-account transfers for accounts owned by the same user.

Figure 5A:
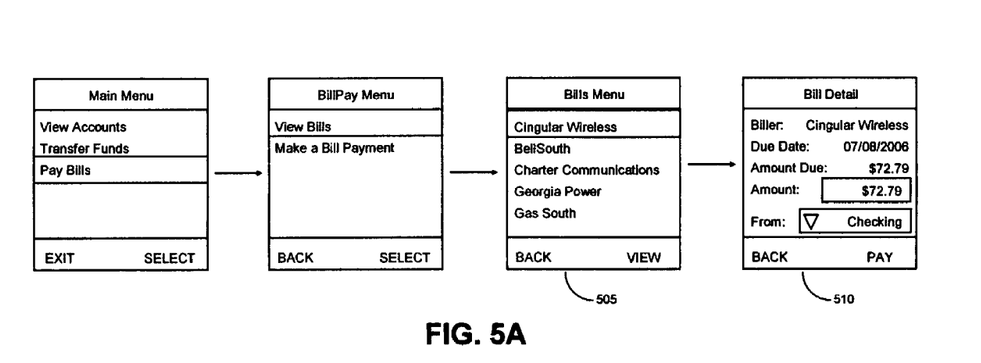
FIGS. 5A and B show how the Mobile Banking application can be used to remit funds to bill payees and external accounts, respectively, according to an exemplary embodiment of the present invention.
Figure 5B:
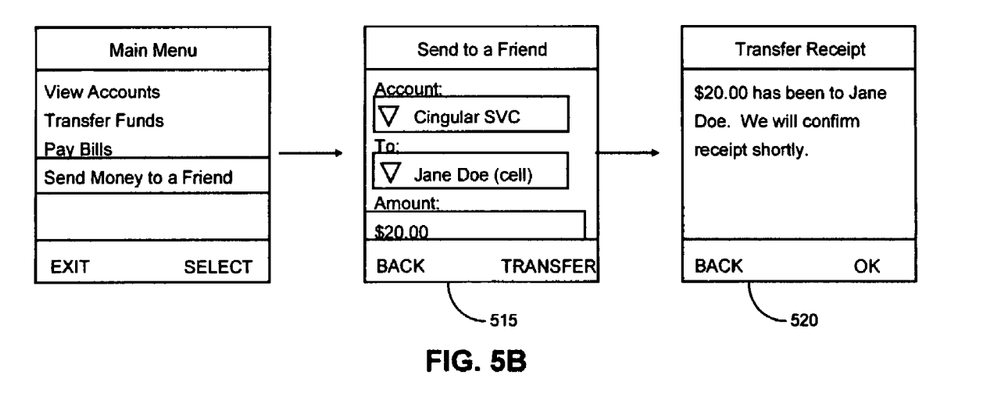

FIGS. 5A and B show how the application can be used to remit payments to external accounts. FIG. 5A shows an example of how to pay bills. This example assumes that the subscriber has previously set up Billpay recipients online, but anyone skilled in the art will realize that it is simply a matter of adding an option to add billpay recipients to be able to perform this task on the mobile device. The subscriber is provided with a list of existing bills 505, and selects, for example, Cingular Wireless as the recipient. A simple form 510 allows the transaction to take place instantaneously. FIG. 5B shows a similar process but for sending money to other accounts. This is generally similar to services such as Paypal, except there are no third parties involved; the transaction is a direct one between the two parties. The subscriber selects a recipient, and types in the amount to be sent in a simple form 515, receiving a confirmation screen 520 that the transaction has been initiated and is pending approval. Funds may be transferred to other mobile subscribers approved by the mobile network, or may be predefined email or similar recipients. In either case, all the subscriber has to do is enter the name, unique email/phone number/SIP address of the recipient, and hit submit.

Ideally, the Mobile Banking application is hosted on a server interconnected with other servers in the DESS. This allows for seamless connectivity with the Mobile Broker. As mentioned elsewhere in this disclosure, the Broker analyzes purchase history, financial transactions, and payments, and is able to provide suggestions and recommendations based on this data. Depending on the subscriber's preferences, the Mobile Broker can monitor financial activity and set up automated tasks for the ease of the subscriber. For instance, the subscriber may be a small business owner who runs a bakery, has two checking accounts, one savings account, and a staff of three. She uses her mobile device to access her account information, but is tired of going to the bank and transferring funds to savings, or writing wage checks to her employees, landlord, and utility companies. This subscriber may set up Mobile Banking and perform all of these transactions with ease. The subscriber sets up her accounts, a list of billpay recipients, and a list of employees as payees. Then, at the end of the month, she uses her mobile device to send funds to her employees, pays her monthly electric and water bill, and sends the rent to her landlord, all via Mobile Banking. The following month, she repeats the exact transactions. At this point, the Mobile Broker has recognized a pattern of Mobile Payment activity in the user profile stored in the IICR, and before month 3 is about to end, a message is sent to the subscriber: "Please confirm that you want to send $xx.xx to name@email.com."

The broker has also recognized the frequency of this transaction, and offers to automatically perform this transaction at the end of every month. The subscriber is not too sure about setting up automatic payments for her employees who may be unreliable, but goes ahead and confirms automatic rent payments for the rest of the year. In this way, the broker has used information in the subscriber's profile to automate a financial transaction, thus making life easier for the subscriber.

In order to maintain privacy, each subscriber is given a unique identifier linking them to the Mobile Broker, and allowing access to each individual financial instrument and also the correlation of these assets to offer recommendations based on current purchases. The Broker creates a private portal to multiple sources, and anonymity is retained by using generic identifiers associated with the subscriber's profile. Various vendors and financial institutions are made aware of nothing more than the fact that a purchase is imminent, and any other information that allows them to compete for the sale.

Many benefits are inherent in the present invention. A benefit of the present invention is that customers will be able to browse and order products while using a cheaper more secure payment method. Additionally, retailers can send customers an electronic list of products that the customer would be interested in, directly to their mobile device. The broker could access a subscriber's location and purchase logs, and notify them of discounts at local stores in which that subscriber would be interested in. Telephones could be equipped with bar-code scanners and shoppers could scan an item and find out its pricing and availability. Additionally, this invention could be used for the purchasing of movie tickets, concert tickets, and other events recommended by the broker based on other information in the subscriber's profile.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for providing recommendations to and automating tasks for a mobile subscriber having a mobile device, said network system comprising:
   a plurality of servers, wherein the plurality of servers sends product, vendor, and pricing information to the mobile subscriber based on purchases made by the mobile subscriber;
   an Intelligent Information Collecting Repository in communication with the servers; and
   a User Profile generated by the Intelligent Information Collecting Repository, the user profile comprising information regarding the purchases made by the mobile subscriber using the mobile device, containing a log of activities performed by the mobile subscriber on the mobile device, and including a plurality of potential credit card accounts defined by the mobile subscriber, the user profile further including a credit score for the mobile subscriber,
   wherein when the mobile subscriber initiates a financial transaction, logic on one or more of the plurality of servers transmits information about the financial transaction and the credit score to a credit card company associated with one of the potential credit card accounts, and receives a response from the credit card company, the response being transmitted to the mobile subscriber, thereby enabling the mobile subscriber to select a best offer from a plurality of credit card companies associated with said plurality of potential credit card accounts.

2. The network system of claim 1, wherein the plurality of servers includes a Mobile Broker and a Mobile Banking application.

3. The network system of claim 2, wherein the plurality of servers and the Intelligent Information Collecting Repository are combined with a Proxy Registration Authentication Collector to form a Dynamic Event Server Subsystem.

4. The network system of claim 3, wherein every network element is SIP-enabled.

5. The network system of claim 2, wherein the record of financial transactions performed using the Mobile Banking application is stored in the User Profile.

6. The network system of claim 5, wherein the plurality of Dynamic Event Servers offers to the mobile subscriber an option to automate the financial transactions.

7. The network system of claim 1, wherein the Mobile Broker is programmed to deliver information to the mobile subscriber; wherein said information is based on the information in the User Profile.

8. A Mobile Broker for providing intelligent feedback to a mobile user performing financial transactions with a mobile device, said Mobile Broker comprising:
   a plurality of SIP-enabled servers;
   a plurality of databases in communication with the servers;
   wherein the plurality of servers and the plurality of databases together form a Dynamic Event Server Subsystem, which sends product, vendor, and pricing information to the mobile user based on the purchases made by the mobile user,
   a User Profile stored in the plurality of databases, the user profile including a plurality of potential credit card accounts defined by the mobile user, the user profile further including a credit score for the mobile user; and
   a unit within the servers programmed to recognize and predict the mobile user's financial transactions based on the User Profile, wherein financial transactions includes purchases made by the mobile subscriber,
   wherein when the mobile user initiates a financial transaction, the unit transmits information about the financial transaction and the credit score to a credit card company associated with one of the potential credit card accounts, and receives a response from the credit card company, the response being transmitted to the mobile user, thereby enabling the mobile user to select a best offer from a plurality of credit card companies associated with said plurality of potential credit card accounts,
   wherein every network element is SIP-enabled.

9. The Mobile Broker of claim 8, wherein financial transactions includes a record of the mobile subscriber's Mobile Banking activities.

10. The Mobile Broker of claim 9, wherein the Dynamic Event Server Subsystem offers to the mobile subscriber an option to automate the mobile subscriber's Mobile Banking activities.

11. A method for providing intelligent feedback to a mobile subscriber having a mobile device, said method comprising the steps of:
    recording the mobile subscriber's interactions with a plurality of applications on the mobile device, the plurality of applications including at least a Mobile Banking application and a Mobile Broker application;
    analyzing the interactions to find patterns of behavior;
    storing the patterns of behavior in a user profile, the user profile further comprising information regarding the purchases made by the mobile subscriber using the mobile device, containing a log of activities performed by the mobile subscriber on the mobile device, and including a plurality of potential credit card accounts defined by the mobile subscriber, the user profile further including a credit score for the mobile subscriber; and
    providing the mobile subscriber with services customized to fit said patterns of behavior in real-time,
    wherein when the mobile subscriber initiates a financial transaction, the Mobile Broker application transmits information about the financial transaction and the credit score to a credit card company associated with one of the potential credit card accounts, and receives a response from the credit card company, the response being transmitted to the mobile subscriber, thereby enabling the mobile subscriber to select a best offer from a plurality of credit card companies associated with said plurality of potential credit card accounts.

12. The method of claim 11, further comprising the step of using SIP to communicate among the mobile device and the plurality of applications.

13. The method of claim 11, further comprising the step of associating the mobile user's patterns of behavior with information from product catalogs provided by a retailer or manufacturer.

* * * * *